United States Patent
Williams et al.

(10) Patent No.: US 9,368,955 B2
(45) Date of Patent: Jun. 14, 2016

(54) SYSTEM AND METHOD TO DERIVE POWER AND TRIP A CIRCUIT BREAKER FROM AN EXTERNAL DEVICE

(71) Applicant: General Electric Company, Schenectady, NY (US)

(72) Inventors: Craig Benjamin Williams, Louisville, KY (US); Timothy Ray Jackson, Louisville, KY (US); Gregory Lynn Jones, LaGrange, KY (US); Ramon Portillo, Louisville, KY (US); Zachary Herman Cull, Louisville, KY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 13/767,002

(22) Filed: Feb. 14, 2013

(65) Prior Publication Data

US 2014/0226243 A1     Aug. 14, 2014

(51) Int. Cl.
| | |
|---|---|
| *H02H 3/20* | (2006.01) |
| *H02H 1/06* | (2006.01) |
| *H02H 3/04* | (2006.01) |
| *H02H 3/08* | (2006.01) |

(52) U.S. Cl.
CPC . *H02H 3/20* (2013.01); *H02H 1/06* (2013.01); *H02H 3/04* (2013.01); *H02H 3/08* (2013.01)

(58) Field of Classification Search
CPC ............. H02H 3/20; H02H 9/04; H02H 1/06; H02H 3/04; H02H 3/08
See application file for complete search history.

(56) References Cited

U.S. PATENT DOCUMENTS

| | | | |
|---|---|---|---|
| 5,875,087 A | 2/1999 | Spencer | |
| 5,907,467 A | 5/1999 | Barbour | |
| 6,356,422 B1 | 3/2002 | Bilac et al. | |
| 7,104,848 B1 * | 9/2006 | Chou et al. | 439/660 |
| 7,327,543 B2 * | 2/2008 | Bolz et al. | 361/91.5 |
| 7,342,328 B1 * | 3/2008 | Eddleman | 307/80 |
| 8,453,814 B2 * | 6/2013 | Gambach et al. | 191/3 |
| 8,587,913 B2 * | 11/2013 | Divan | 361/93.9 |
| 2003/0063422 A1 | 4/2003 | Bilac | |
| 2003/0123209 A1 | 7/2003 | Kim | |
| 2003/0193767 A1 | 10/2003 | Vicente et al. | |
| 2004/0227036 A1 * | 11/2004 | Arita et al. | 246/209 |
| 2005/0141681 A1 | 6/2005 | Graiger | |

(Continued)

FOREIGN PATENT DOCUMENTS

| | | |
|---|---|---|
| CA | 2107319 | 5/2005 |
| CN | 101162851 A | 4/2008 |

(Continued)

OTHER PUBLICATIONS

The Authoritative Dictionary of IEEE Standard Terms, 7$^{th}$ Edition, 2000, Standard Information Network IEEE Press, p. 844.*

(Continued)

*Primary Examiner* — Zeev V Kitov
(74) *Attorney, Agent, or Firm* — General Electric Company (57) ABSTRACT

An electronic trip unit (ETU) configured to trip a circuit breaker using power from an external device is provided. Additionally, a system for enabling an electronic control unit (ETU) to trip a circuit breaker using power from an external device is provided. Further, a method for enabling an electronic trip unit (ETU) to trip a circuit breaker using power from an external device is provided.

20 Claims, 4 Drawing Sheets

(56) References Cited

U.S. PATENT DOCUMENTS

| | | |
|---|---|---|
| 2007/0133140 A1 | 6/2007 | Vicente et al. |
| 2009/0256426 A1 | 10/2009 | Vicente et al. |
| 2010/0052829 A1 | 3/2010 | Anand et al. |

FOREIGN PATENT DOCUMENTS

| | | | | |
|---|---|---|---|---|
| EP | 0649207 | A1 | 4/1995 | |
| EP | 0945949 | A2 | 9/1999 | |
| JP | 02188101 | * | 7/1990 | ............ H02M 3/135 |
| JP | 09166634 | A2 | 6/1997 | |
| JP | 10336880 | A2 | 12/1998 | |
| JP | 2001169457 | A2 | 6/2001 | |
| JP | 2006280024 | A2 | 10/2006 | |
| WO | 0074192 | A1 | 12/2000 | |
| WO | 02054557 | A1 | 7/2002 | |
| WO | 03030326 | A1 | 4/2003 | |
| WO | 03073577 | A1 | 9/2003 | |
| WO | 2006128233 | A1 | 12/2006 | |
| WO | 2007033169 | A2 | 3/2007 | |
| WO | 2008128871 | A1 | 10/2008 | |
| WO | 2009122290 | A2 | 10/2009 | |
| WO | 2009155661 | A1 | 12/2009 | |

OTHER PUBLICATIONS

Siemens Electronic Unit for SB Encased Systems Breakers, Information and Instruction Guide; 1991; 43 pages.

* cited by examiner

SYSTEM AND METHOD TO DERIVE POWER AND TRIP A CIRCUIT BREAKER FROM AN EXTERNAL DEVICE

BACKGROUND OF THE INVENTION

The field of the invention relates generally to electronic trip units (ETUs) and more particularly to power management within an ETU.

An electronic trip unit is a device that protects a circuit and equipment connected to the circuit. In industrial settings, for example, an ETU serves to prevent damage to equipment and machines that, in many cases, represent a significant investment by a business and on whose operation the business relies. An ETU carries out this function by monitoring electrical current through a line and, if the current exceeds a certain threshold, will open a switch in the line, thereby preventing further current from reaching devices that would be damaged by the excessive current. The switch may be opened and closed by, for example, an electromechanical actuator.

Given the role that an ETU plays in protecting the equipment connected to it, it is correspondingly important to ensure that the ETU is in proper working order, through diagnostics and maintenance. A special-purpose testing kit, external to an ETU, is typically needed to determine the status of the ETU. The testing kit is designed and configured to provide power to the ETU and determine whether any malfunctions have occurred. For example, the testing kit provides an electrical command, along with sufficient power, for the ETU to actuate the circuit breaker. Without the special-purpose testing kit, a technician is unable to perform the above diagnostics.

Some data-communication connections, such as Universal Serial Bus (USB) connections, provide power from a host device to one or more devices connected to the host. Most general-purpose computer devices, such as laptops and personal computers, are configured to act as USB hosts. Moreover, battery packs, wall outlet power supplies, and other power-supplying devices with USB host power capabilities are common. However, tripping an industrial circuit breaker requires more power than a USB connection is able to provide directly. Accordingly, USB host devices are unable to act as replacements for the special-purpose testing kits described above.

BRIEF DESCRIPTION OF THE INVENTION

In one aspect, an electronic trip unit (ETU) configured to trip a circuit breaker using power from an external device is provided. The ETU includes a peripheral port, a power converter, and an energy-storage device. The peripheral port is configured to be coupled to the external device. The power converter is coupled to the peripheral port and the energy-storage device. The energy-storage device is coupled to a tripping mechanism within the circuit breaker. The tripping mechanism is configured to trip upon receipt of a voltage greater than or equal to a threshold voltage. The ETU is configured to receive a power input having a first voltage from the peripheral port, wherein the first voltage is less than the threshold voltage and convert at least a portion of the power input to a power output having a second voltage using the power converter and the energy-storage device. The second voltage is greater than the first voltage. The ETU is further configured to provide the power output from the energy-storage device to the tripping mechanism when the second voltage is greater than or equal to the threshold voltage.

In another aspect, a system is provided. The system includes a circuit breaker including a tripping mechanism, an external device, and an electronic trip unit (ETU). The ETU includes a peripheral port, a power converter, and an energy-storage device. The peripheral port is coupled to the external device. The power converter is coupled to the peripheral port and the energy-storage device. The energy-storage device is coupled to the tripping mechanism. The tripping mechanism is configured to trip upon receipt of a voltage greater than or equal to a threshold voltage. The ETU is configured to receive a power input having a first voltage from the peripheral port, wherein the first voltage is less than the threshold voltage, and convert at least a portion of the power input to a power output having a second voltage using the power converter and the energy-storage device. The second voltage is greater than the first voltage. The ETU is further configured to provide the power output from the energy-storage device to the tripping mechanism when the second voltage is greater than or equal to the threshold voltage.

In another aspect, a method for enabling an electronic trip unit (ETU) to trip a circuit breaker using power from an external device is provided. The ETU includes a peripheral port, a power converter, and an energy-storage device. The peripheral port is configured to be coupled to the external device. The power converter is coupled to the peripheral port and the energy-storage device. The energy-storage device is coupled to a tripping mechanism within the circuit breaker. The tripping mechanism is configured to trip upon receipt of a voltage greater than or equal to a threshold voltage. The method is implemented by the ETU and includes receiving a power input having a first voltage from the peripheral port, wherein the first voltage is less than the threshold voltage. The method further includes converting at least a portion of the power input to a power output having a second voltage using the power converter and the energy-storage device. The second voltage is greater than the first voltage. The method further includes determining when the second voltage is greater than or equal to the threshold voltage.

DETAILED DESCRIPTION OF THE INVENTION

Figure 1:
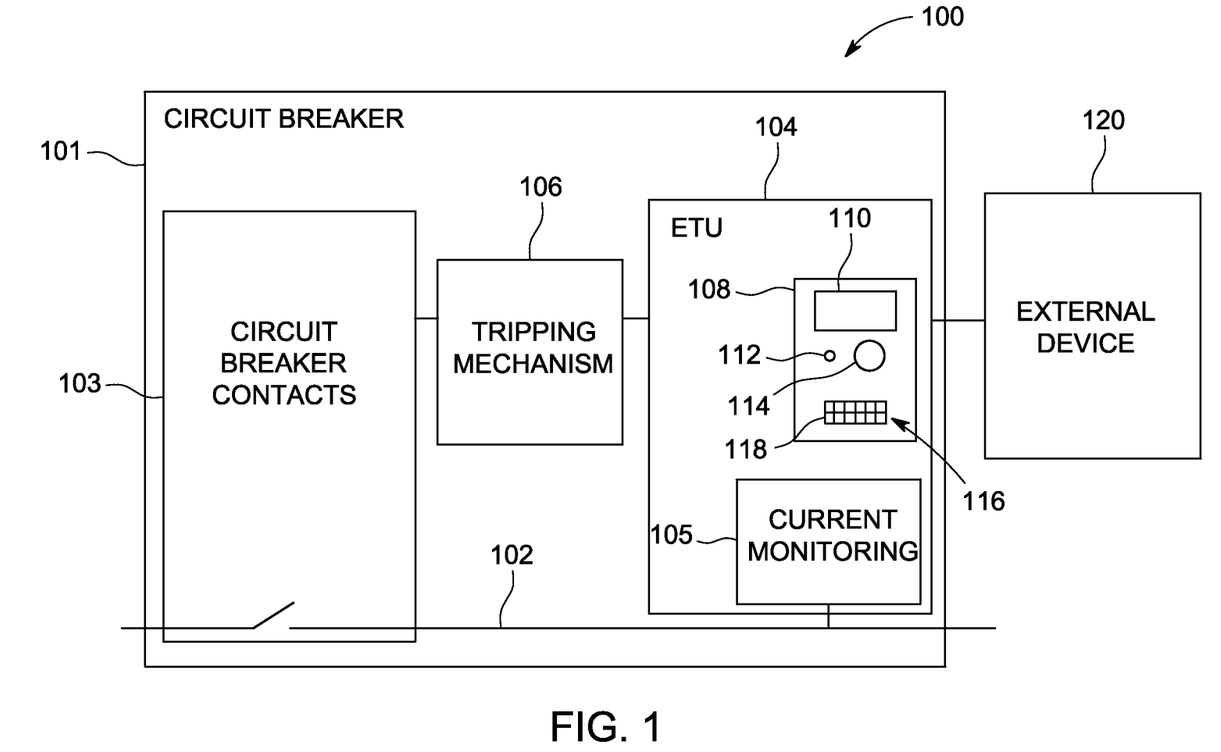
FIG. 1 is a block diagram of a system for enabling an ETU to trip a circuit breaker using power from an external device, in accordance with an exemplary embodiment of the present invention.

FIG. 1 is a block diagram of a system 100 for enabling an ETU 104 to energize a tripping mechanism 106 of a circuit breaker 101 using power from an external device 120 that is limited in voltage and/or current, in accordance with an exemplary embodiment of the present invention. In this description, the term "limited" when used to describe the voltage and/or current available from external device 120 means that the voltage and/or current is insufficient to directly actuate or trip tripping mechanism 106 in circuit breaker 101. In this description, tripping circuit breaker 101 means energizing, and thereby tripping or actuating tripping mechanism 106 of circuit breaker 101. Circuit 102 is, for example, a circuit in an industrial environment and is rated to carry a certain maximum amount of current. Circuit 102 is monitored by electronic trip unit (ETU) 104. That is, using current monitoring circuitry 105, ETU 104 monitors the current in circuit 102. If a fault is detected, ETU 104 causes tripping mechanism 106 to stop the flow of current in circuit 102. A fault in circuit 102 may be detected by ETU 104 if, for example, the current in circuit 102 increases beyond the maximum amount of current.

Tripping mechanism 106 includes a switch that, when actuated, prevents current from flowing through two contacts 103 in circuit 102. Tripping mechanism 106 includes, for example, an electromechanical actuator or flux shifter engages a mechanism that physically separates two contacts 103 in circuit 102. In certain embodiments, tripping mechanism 106 is incorporated into ETU 104. In alternative embodiments, tripping mechanism 106 is electrically coupled to ETU 104. ETU 104 includes a human-machine interface (HMI) 108. HMI 108 includes a visual display such as liquid crystal display (LCD) 110, a light emitting diode (LED) 112, a speaker 114, and an input panel 116 including at least one button 118. Other embodiments may include an HMI with only a subset of the above-described components of HMI 108. Yet other embodiments may have no HMI at all.

Electrically coupled to ETU 104 is external device 120 which, as discussed above, is limited in available voltage and/or available current. In the exemplary embodiment, external device 120 is configured to function as a Universal Serial Bus (USB) host. USB is a set of standards and protocols relating to a serial bus for communicating data and carrying power from a host device to one or more devices connected to the host. USB standards limit the maximum amount of current to be supplied from the host to a connected device at 500 milliamps. Additionally, the voltage supplied by a USB host is 5 volts, (+0.5, −0.6). External device 120 may be a notebook or laptop computer, a desktop computer, a tablet computer or other handheld computer. Alternatively, external device 120 may be one or more batteries, or an AC adapter capable of interfacing with ETU 104 through a USB port. Tripping mechanism 106 requires more voltage than is provided by a USB host in order to trip (or "actuate") and prevent current from flowing in circuit 102. In one embodiment, tripping mechanism 106 requires approximately 8 volts to trip. In alternative embodiments, tripping mechanism 106 requires more voltage in order to trip. Although use of USB is described as an exemplary bus for communicating data and carrying power, any other bus that does not provide sufficient power (e.g., limited in available voltage and/or available current) to directly actuate tripping mechanism 106 is within the scope of the present disclosure.

In accordance with the present disclosure, a technician or other user connects external device 120 to ETU 104 to determine the status of ETU 104 and test whether ETU 104 can actuate tripping mechanism 106. In the exemplary embodiment, external device 120 provides power to ETU 104. In some embodiments, external device 120 also issues a command to ETU 104 to actuate tripping mechanism 106. In other embodiments, ETU 104 determines when to actuate tripping mechanism 106, rather than awaiting a command from external device 120. Additionally, a button 118 included in input panel 116, when pressed, issues an instruction to ETU 104 to actuate tripping mechanism 106. In alternative embodiments, button 118 is not included in input panel 116. ETU 104 may ignore an instruction to actuate tripping mechanism 106 if insufficient power is available to energize and thereby actuate tripping mechanism 106. In the exemplary embodiment, LED 112 illuminates to inform the user that ETU 104 is ready to energize tripping mechanism 106. In alternative embodiments, LED 112 illuminates to inform the user that an error or malfunction is present in ETU 104, tripping mechanism 106, and/or circuit 102, or that tripping mechanism 106 was successfully actuated. Speaker 114 may provide such information audibly, rather than visually. In addition, LCD 110 may provide such information in visual form, using text and/or images.

Figure 2:
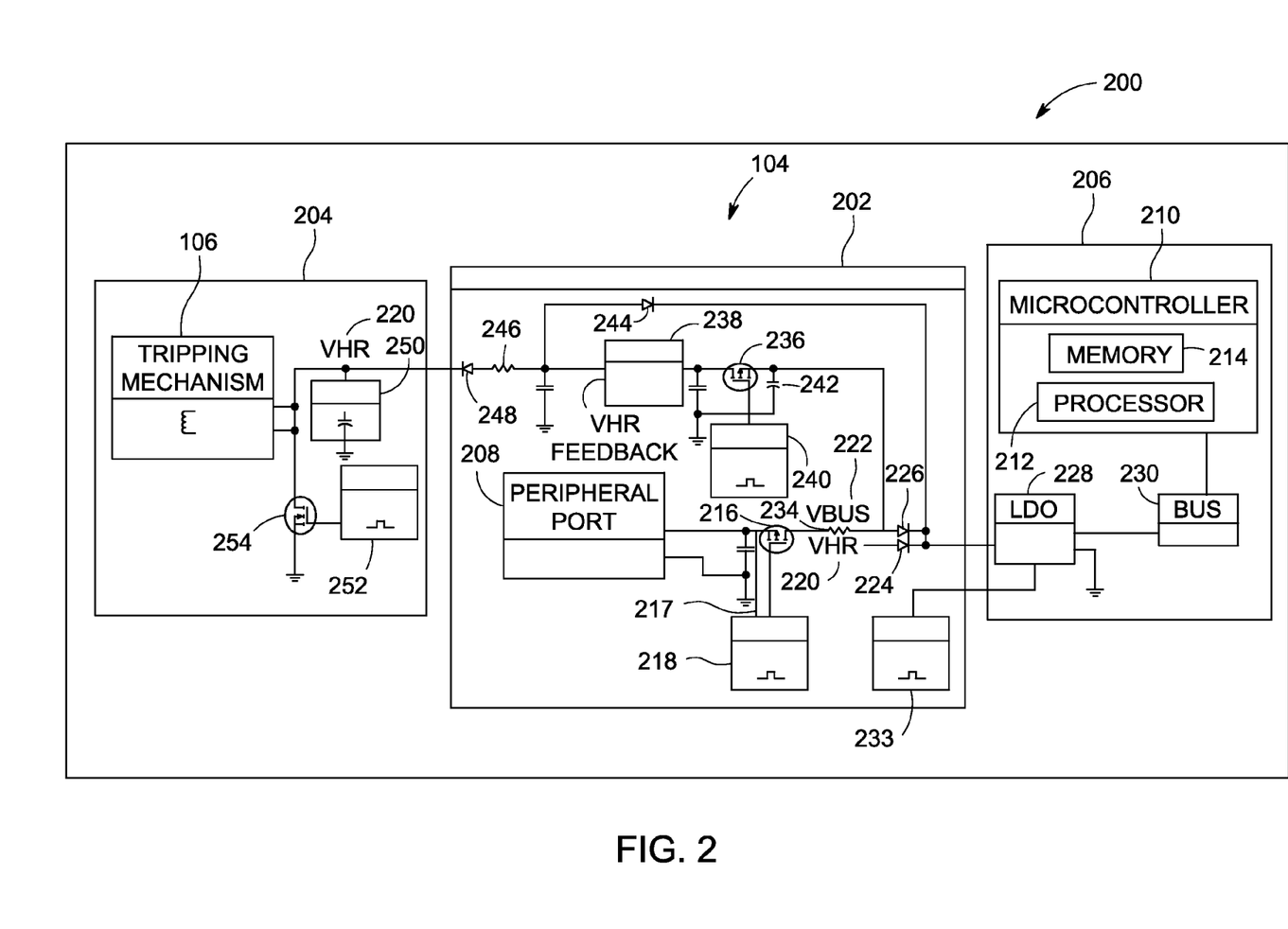
FIG. 2 is a block diagram of components within an ETU that is capable of tripping a circuit breaker using power from an external device, in accordance with an exemplary embodiment of the present invention.

FIG. 2 is a block diagram 200 of components within ETU 104. ETU 104 is capable of energizing and thereby actuating tripping mechanism 106 using power from external device 120 (FIG. 1). Block 202 includes components of ETU 104 that are primarily related to interfacing with and obtaining power from external device 120 (FIG. 1). Components of block 204 pertain to tripping mechanism 106 and components of ETU 104 used for energizing tripping mechanism 106 such that tripping mechanism 106 is actuated. Block 206 includes components of ETU 104 that relate to processing data and issuing commands to other components of ETU 104.

Peripheral port 208 receives power and/or data from external device 120 (FIG. 1). External device 120 (FIG. 1) sends and receives data to and from ETU 104, and more particularly microcontroller 210, pursuant to a USB standard such as USB 2.0. Microcontroller 210 includes a processor 212 coupled to a memory 214. Memory 214 contains processor-executable instructions for receiving signals, such as current or voltage measurements, from other components within ETU 104, issuing commands to components of ETU 104 and tripping mechanism 106, storing and retrieving settings pertaining to operation and management of ETU 104, and communicating with external device 120 (FIG. 1). For example, microcontroller 210 may communicate with external device 120 (FIG. 1) to change the amount of current provided from external device from 100 milliamps to 500 milliamps. Microcontroller 210 may apply the additional current to additional functions, such as illuminating LCD 110, communicating pursuant to one or more additional communication protocols, such as RS-485, or carrying out additional protection algorithms. Microcontroller 210 may also manage and eliminate non-critical loads to ensure that power is not diverted to other subsystems of ETU 104 that would prevent an energy-storage device 250 in ETU 104 from becoming sufficiently charged to energize tripping mechanism 106, as explained below. In the exemplary embodiment, while microcontroller 210 detects the presence of power from peripheral port 208, microcontroller 210 will maintain primary circuit protection functions of ETU 104. This is achieved by detecting circuit breaker input phase current flow and initiating circuit-protection algorithms in the case of a ground fault detection, or when otherwise necessary. Further, in the exemplary embodiment, microcontroller 210 ensures that plugging and unplugging of external device 120 (FIG. 1) into and out of peripheral port 208 occurs without negatively impacting the above-mentioned circuit-protection algorithms.

In the exemplary embodiment, ETU 104 further ensures that a seamless transition is made between power from peripheral port 208 and any other sources of power available to ETU 104. This is achieved by logically ORing the input power from peripheral port 208 with an alterative power source that provides power to logic-level devices within ETU 104. In some embodiments, ETU 104 may detect the presence of power from peripheral port 208 and disable communication and/or power distribution from peripheral port 208. In some embodiments, input power from peripheral port 208 and power from other power sources may be logically ORed into reset circuitry for microcontroller 210. This configuration assists microcontroller 210 in coming out of a reset mode.

Memory 214 contains settings pertaining to operation and management of ETU 104. Memory 214 also includes data containing measurements of, for example, voltages and/or currents, from components of ETU 104. In alternative embodiments, memory 214 may contain a subset of the above-discussed processor-executable instructions and settings, or additional processor-executable instructions and settings beyond those expressly described above. Coupled to peripheral port 208 is a switch 216, which may be opened to electrically decouple peripheral port 208 and external device 120 (FIG. 1) from the remainder of ETU 104. Switch 216 may be closed to couple peripheral port 208 and external device 120 (FIG. 1) to the remainder of ETU 104.

Switch 216 may be opened and closed by a signal, such as a voltage pulse 218, from microcontroller 210. A feedback and control line 217 allows microcontroller 210 to monitor an input current from peripheral port 208 and determine whether to open or close switch 216. In alternative embodiments, a button, such as button 118 on input panel 116 may be pressed to open or close switch 216. The primary and critical function of ETU 104 is to monitor circuit 102 and cause tripping mechanism 106 to prevent current from flowing in circuit 102 if an unsafe condition, such as a short circuit or other fault, is detected by ETU 104. Accordingly, if being coupled to external device 120 puts this critical functionality in jeopardy, microcontroller 210 may send pulse 218 to switch 216 causing switch 216 to open. For example, ETU 104 may detect a short circuit at peripheral port 208, causing microcontroller 210 to issue pulse 218, causing switch 216 to open. In alternative embodiments, rather than completely decoupling peripheral port 208 and external device 120 (FIG. 1) from the remainder of ETU 104, switch 216 instead enables and disables either data communications or the availability of power from external device 120 (FIG. 1).

ETU 104 includes a line 220, which supplies power to various components within ETU 104. Additionally, ETU 104 includes a line 222, which carries data and/or power from peripheral port 208 to components of ETU 104. For simplicity in FIG. 2, line 222 is shown as a single line. However, in actual embodiments, line 222 may be a plurality of lines, wherein one or more lines carry power and one or more lines carry data. Coupled to line 220 is diode 224. Diodes 224 and 226 are logically ORed, such that whichever of the two corresponding lines 220 and 222 has a higher voltage provides power to a low-dropout (LDO) linear regulator (hereinafter, "LDO power converter") 228. LDO power converter 228 converts an input power to an output power with a lower voltage than the voltage of the input power. For example, the input power may have a voltage of 13 volts to 4.4 volts, and LDO power converter 228 outputs a power having a voltage of 3.3 volts. The output power is delivered by bus 230 to components of ETU 104 requiring a reduced voltage, including analog and digital circuitry, and microcontroller 210. In alternative embodiments, LDO power converter 228 is a switched-mode power supply (SMPS), or boost/buck converter. In alternative embodiments, LDO power converter 228 may serve as an auxiliary power supply.

LDO power converter 228 may receive a signal, such as a pulse 233 from microcontroller 210, to decrease power to all components receiving power from LDO power converter 228. That is, LDO power converted 228 and components receiving power therefrom may operate in a low-power or "sleep" mode. LDO power converter 228 may receive another pulse 233 to provide power to components coupled thereto in a normal-power or "non-sleep" mode. In alternative embodiments, rather than microcontroller 210 issuing a pulse to LDO power converter 228 to switch between the sleep and non-sleep modes, a button on input panel 116, when pressed, may cause LDO power converter 228 to switch between the two modes. In other embodiments, a signal from external device 120 (FIG. 1) received from peripheral port 208 causes LDO power converter 228 and components receiving power from LDO power converter 228 to enter into sleep mode. In some embodiments, sleep mode causes LDO power converter 228 to provide no power at all, and components which would normally receive power from LDO power converter 228 instead obtain power from a bulk capacitor. In some embodiments, microcontroller will periodically "wake-up" or temporarily switch into a normal-power mode and poll conditions in ETU 104. Additionally, in some embodiments, the detection of a fault or other condition requiring the circuit protection functionality of ETU 104 will cause all components to switch out of sleep mode.

A current-limiting device, for example a resistor 234, is coupled to line 222. Resistor 234 limits an in-rush current and/or a steady-state current to components downstream of resistor 234. For example, resistor 234 may prevent components downstream of resistor 234 from drawing more than 100 milliamps. A switch 236 is coupled to resistor 234, and, when opened, prevents power from being provided to a power converter 238. When closed, switch 236 allows power to be provided to power converter 238. Switch 236 may be opened and closed by a pulse 240 issued by microcontroller 210. In alternative embodiments, switch 236 may be opened and closed by a button on input panel 116 (FIG. 1). A bulk capacitor 242 is coupled between resistor 234 and ground. Bulk capacitor 242 minimizes variations in current from external device 120 (FIG. 1) to power converter 238.

Power converter 238 receives an input power from line 222 and produces an output power with a greater voltage than the voltage of the input power. Power converter 238 includes, for example, a charge pump, a boost converter, or a switched mode power supply. Power converter 238, may also include soft-start circuitry to prevent a spike in the amount of current drawn by power converter 238 when it is initiated. Coupled to power converter 238 is a diode 244. As mentioned above, the output power of power converter 238 has a greater voltage than the input power. Accordingly, if switch 236 is closed, the voltage of the output power from power converter 238 is greater than the voltage of line 222. Accordingly, diode 226 prevents current from line 222 from passing directly to LDO power converter 228 when switch 236 is closed. Also coupled to power converter 238 is another current-limiting device, for example a resistor 246. Resistor 246 limits an in-rush current and/or a steady-state current to components downstream of resistor 246. Coupled between resistor 246 and an energy-storage device 250 is a diode 248. Output power from power converter 238 is provided to energy-storage device 250. Energy-storage device 250 is, for example, a bulk capacitor. In other embodiments, energy-storage device 250 is a battery. As energy is stored in energy-storage device 250, a voltage of energy-storage device increases. Line 220 is coupled to energy-storage device 250. Accordingly, the voltage of line 220 increases as the voltage in energy-storage device 250 increases. Again, line 220 is ORed with line 222 at diode 224. Diode 224 provides a path to supply LDO power converter 228 when the voltage of line 220 happens to be higher than the boosted voltage (e.g., during normal operation when powered from a current transformer (not shown) and not boosting, or when an alternative auxiliary power (not shown) is supplied).

ETU 104 monitors the voltage of energy-storage device 250 and when the voltage reaches a required amount of voltage to energize tripping mechanism 106, ETU 104 energizes tripping mechanism 106 causing tripping mechanism 106 to actuate. In the exemplary embodiment, microcontroller 210 monitors the voltage of energy-storage device 250 and sends a pulse 252 causing switch 254 to close. When switch 254 closes, energy-storage device 250 discharges into tripping mechanism 106 with sufficient voltage and energy to cause tripping mechanism 106 to disengage circuit breaker contacts 103 (FIG. 1) to trip and prevent the flow of current in circuit 102 (FIG. 1). In the exemplary embodiment, tripping mechanism 106 requires approximately 8 volts to actuate (trip). In other embodiments, tripping mechanism 106 requires a greater voltage to actuate. Also, in other embodiments, rather than microcontroller 210 monitoring the voltage in energy-storage device 250 and sending pulse 252, analog circuitry carries out these functions.

In some embodiments, one or more components of HMI 108 (FIG. 1), such as LCD 110, LED 112, or speaker 114 indicate that the voltage of energy-storage device 250 is sufficient to energize tripping mechanism 106. In other embodiments, one or more components of HMI 108 (FIG. 1), such as LCD 110, LED 112, or speaker 114 indicate that tripping mechanism 106 was successfully tripped. In other embodiments, one or more components of HMI 108 (FIG. 1), such as LCD 110, LED 112, or speaker 114 indicate a malfunction or error, for example that external device 120 (FIG. 1) is disconnected from ETU 104 by switch 216, as explained above, or that tripping mechanism 106 could not be tripped.

Figure 3:
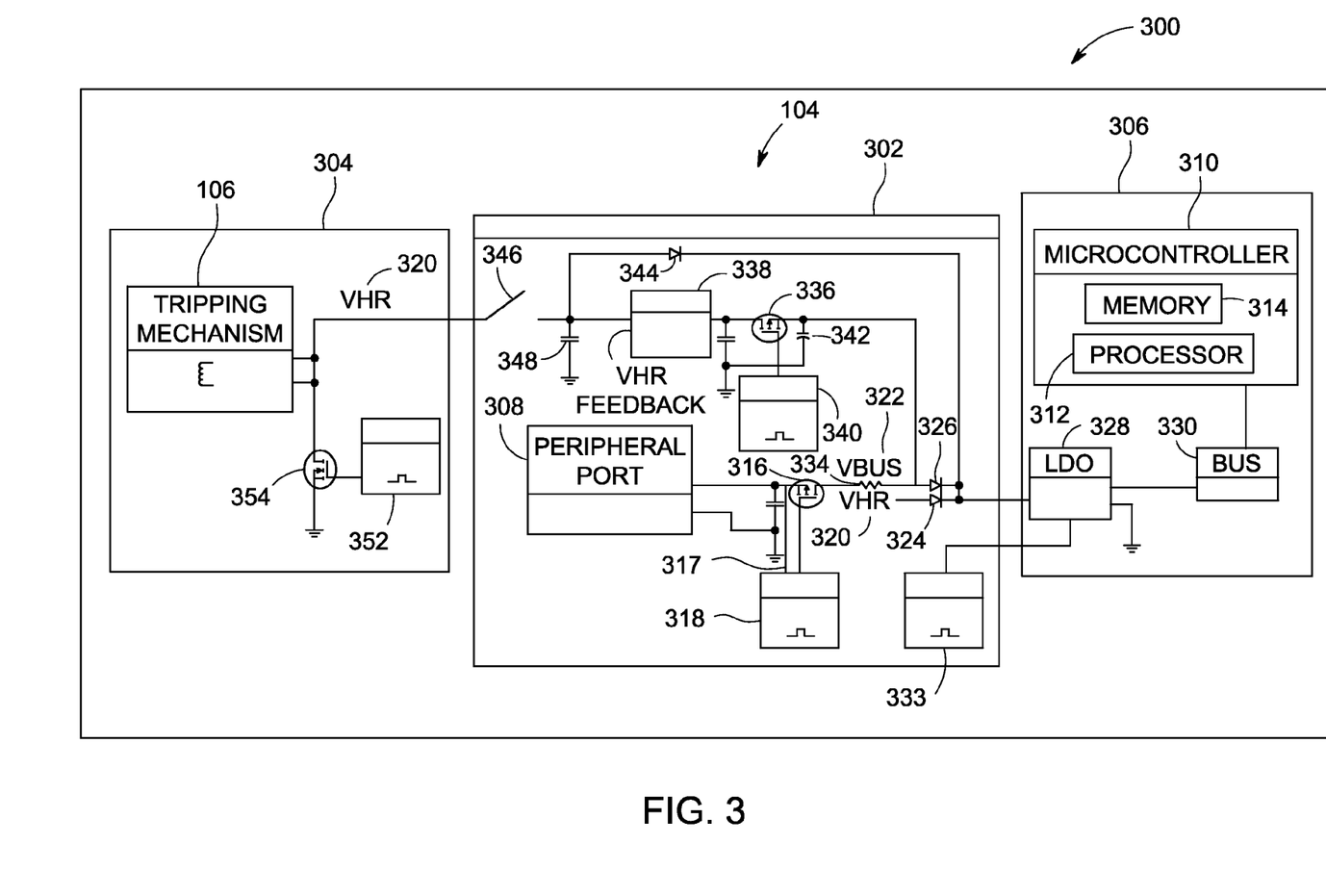
FIG. 3 is a block diagram of components within an ETU that is capable of tripping a circuit breaker using power from an external device, in accordance with an alternative embodiment of the present invention.

FIG. 3 is a block diagram 300 of components within ETU 104, in an alternative embodiment of the present invention. Blocks 302, 304, and 306 are similar to blocks 202, 204, and 206 of FIG. 3. Likewise microcontroller 310 is similar to microcontroller 210, processor 312 is similar to processor 212, memory 314 is similar to memory 214, switch 316 is similar to switch 216, feedback and control line 317 is similar to feedback and control line 217, pulse 318 is similar to pulse 218, line 320 is similar to line 220, line 322 is similar to line 222, diode 324 is similar to diode 224, diode 326 is similar to diode 226, LDO power converter 328 is similar to LDO power converter 228, bus 330 is similar to bus 230, pulse 333 is similar to pulse 233, resistor 334 is similar to resistor 234, switch 336 is similar to switch 236, power converter 338 is similar to power converter 238, pulse 340 is similar to pulse 240, diode 344 is similar to diode 244, pulse 352 is similar to pulse 252, and switch 354 is similar to switch 254. However, in place of resistor 246 and diode 248 of FIG. 2 is a switch 346. Additionally, energy-storage device 250 of FIG. 2 is not included in block diagram 300 of FIG. 3. Rather, output power from power converter 338 is provided to energy-storage device 348, which in some embodiments is a capacitor. As energy is stored in energy-storage device 348, a voltage of energy-storage device 348 increases. ETU 104 closes switch 346 when the voltage of energy-storage device 348 is sufficient to actuate tripping mechanism 106. In other embodiments, energy-storage device 250 is included as shown in FIG. 2, and is coupled to power converter 238 though a switch, similar to switch 346 of FIG. 3. In addition, in some embodiments, a diode is coupled between energy storage device 250 and a switch similar to switch 346 of FIG. 3.

Figure 4:
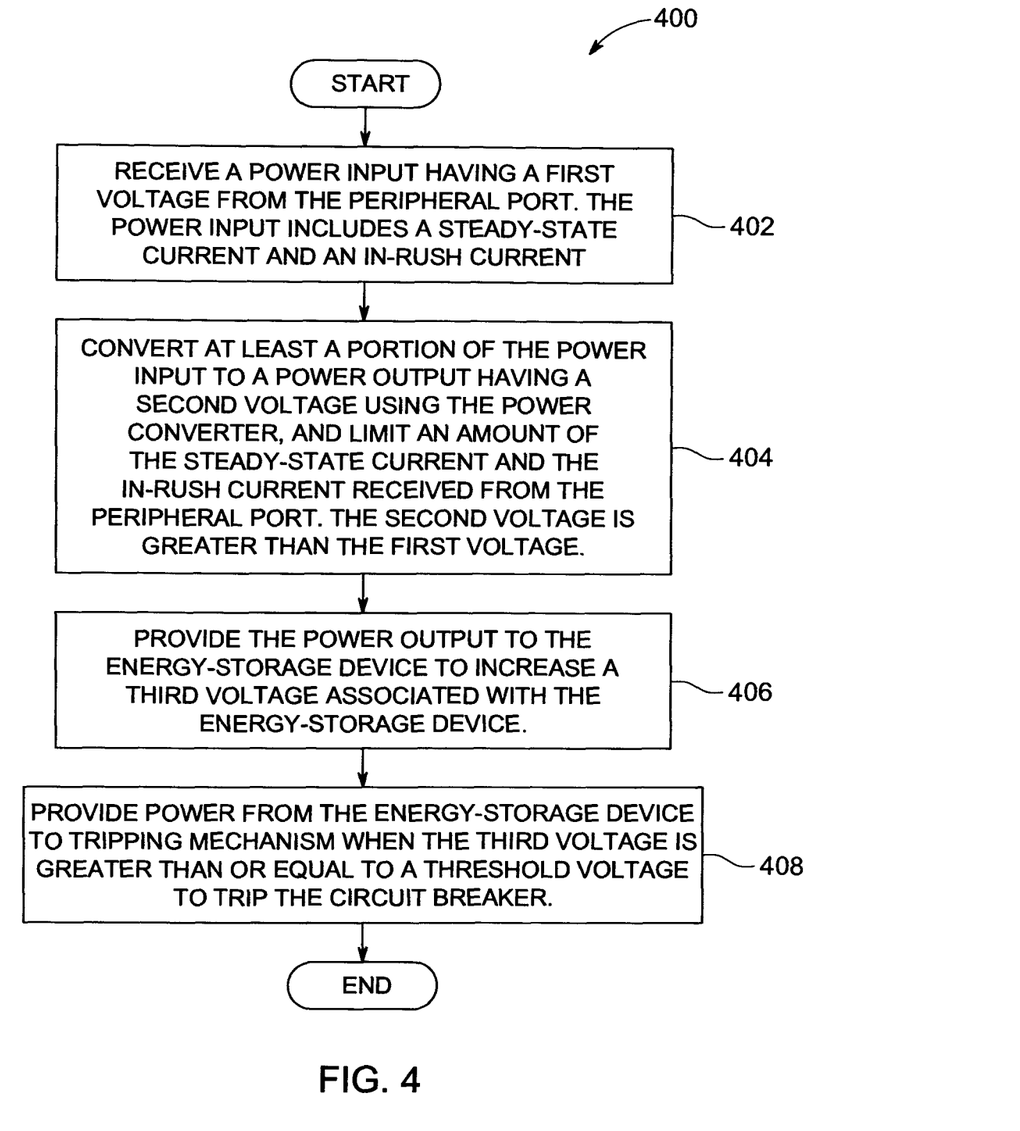
FIG. 4 is a flowchart of a method for enabling an ETU to trip a circuit breaker using power from an external device, in accordance with an exemplary embodiment of the present invention.

FIG. 4 is a flowchart of a method 400 for enabling ETU 104 to energize tripping mechanism 106 using power from external device 120, in accordance with an exemplary embodiment of the present invention. Method 400 is implemented by ETU 104 and the components illustrated in FIG. 2 are referenced in the following description. Those skilled in the art will appreciate that the components illustrated in FIG. 3, described above, could alternatively be used to carry out the steps described below. At step 402, ETU 104 receives a power input having a first voltage from peripheral port 208. The power input includes a steady-state current and an in-rush current. The power is provided by external device 120, which is connected to peripheral port 208. As mentioned above, external device 120 is limited in available voltage and/or available current.

At step 404, ETU 104 converts at least a portion the power input to a power output having a second voltage. During this step, ETU 104 also limits an amount of the steady-state current and the in-rush current received from the peripheral port, for example, using resistor 234. Power converter 238 produces a power output based on the power input from external device 120. The second voltage (i.e., the voltage of the power output from power converter 238) is greater than the first voltage (i.e., the voltage of the power input). In some embodiments, the second voltage is a multiple of the first voltage, for example, two, three, or four times the first voltage. Coupled to power converter 238 is energy-storage device 250, which causes the second voltage to increase over time. At step 406, ETU 104 determines when the second voltage is greater than or equal to a threshold voltage needed to actuate tripping mechanism 106.

At step 408, ETU 104 provides power from energy-storage device 250 to tripping mechanism 106, causing tripping mechanism 106 to trip and prevent the flow of current in circuit 102. ETU 104 carries out step 408 when the second voltage is determined to be greater than or equal to a threshold voltage. Tripping mechanism 106 is configured to actuate upon receiving a voltage greater than or equal to the threshold voltage. The threshold voltage is the amount of voltage required to energize tripping mechanism 106 and cause tripping mechanism 106 to actuate (trip). For example, microcontroller 210 may include in memory 214, data pertaining to the threshold voltage required to actuate tripping mechanism 106, and will send pulse 252 to switch 254, causing energy-storage device 250 to provide power to tripping mechanism 106 when microcontroller 210 determines that the second voltage is greater than or equal to the threshold voltage. As explained above, ETU 104 may provide an indication through LCD 110, LED 112, and/or speaker 114 that power is detected at peripheral port 208, that ETU 104 is powered and ready to energize tripping mechanism 106, that power at peripheral port 208 is not detected, that tripping mechanism 106 was successfully tripped, that tripping mechanism 106 was unsuccessfully tripped, and/or that another event, error, or malfunction occurred. In some embodiments, ETU 104 communicates a level of boosted voltage to external device 120 and awaits a command from external device 120 through peripheral port 208 to energize, and thereby actuate, tripping mechanism 106. Additionally, ETU 104 may provide feedback of whether the tripping mechanism 106 was successfully actuated (tripped) to external device 120.

Technical effects of the present invention include at least one of: (a) receiving a power input having a first voltage from an external device coupled to a peripheral port, the first voltage being less than a threshold voltage; (b) converting at least a portion of the power input to a power output having a second voltage using a power converter and an energy-storage device, wherein the second voltage is greater than the first voltage; (c) determining when the second voltage is greater than or equal to the threshold voltage; and (d) providing the power output from the energy-storage device to a tripping mechanism upon determining that the second voltage is greater than or equal to the threshold voltage.

It should be understood that in the foregoing methods, wherein reference is made to ETU 104 carrying out the steps of the methods, the steps are carried out by components of ETU 104 shown and described with reference to FIGS. 1-3. Further, and as stated above, it should be understood that components illustrated in FIGS. 2 and 3 can be separate from each other or included within other components. For example, microcontrollers 210 and 310 may carry out functions that could otherwise be carried out by dedicated hardware.

Though microcontrollers 210 and 310 have been discussed herein, each of microcontrollers 210 and 310 may instead be, for example, one or more reduced instruction set circuits (RISC), one or more application specific integrated circuits (ASICs), one or more logic circuits, and/or any other circuit or processor capable of executing the functions described herein. Further, references to memory in this specification may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

While the example embodiments are described above in relation to actuating tripping mechanism 106 for circuit breaker 101, other embodiments may be used to enable an external device providing power at a first voltage to actuate any other type of device that requires a second, higher voltage to be actuated. For example, tripping mechanism 106 may be replaced with a relay, for example a relay that activates a ground-fault alarm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic trip unit (ETU) configured to trip a circuit breaker using power from an external device, said ETU comprising:
   a peripheral port;
   a power converter;
   a microcontroller; and
   an energy-storage device,
   wherein said peripheral port is configured to be coupled to the external device, said power converter is coupled to said peripheral port and said energy-storage device, and said energy-storage device is coupled to a tripping mechanism within the circuit breaker, wherein the tripping mechanism is configured to trip upon receipt of a voltage greater than or equal to a threshold voltage, said ETU is configured to:
   receive a power input having a first voltage from said peripheral port, wherein the first voltage is less than the threshold voltage;
   determine, using said microcontroller, that providing a portion of the power input from said peripheral port to at least one component of said ETU would prevent said ETU from becoming sufficiently charged to generate a voltage greater than or equal to the threshold voltage;
   divert, based on the determination, the power input away from the at least one component;
   convert at least a portion of the power input to a power output having a second voltage using said power converter and said energy-storage device, wherein the second voltage is greater than the first voltage; and
   provide the power output from said energy-storage device to the tripping mechanism when the second voltage is greater than or equal to the threshold voltage.

2. The ETU of claim 1, wherein said ETU further comprises a first switch coupled between said peripheral port and said power converter, and said ETU is further configured to close said first switch to transmit the at least a portion of the power input to said power converter.

3. The ETU of claim 2, wherein said microcontroller comprises a processor and said ETU is further configured such that closing said first switch to transmit the at least a portion of the power input to said power converter further includes sending a signal from said processor to close said first switch.

4. The ETU of claim 1, wherein said ETU further comprises a first switch to control a supply of power from said energy-storage device to the tripping mechanism, and said ETU is further configured to close said first switch to provide the power output from said energy-storage device to the tripping mechanism.

5. The ETU of claim 4, wherein said microcontroller comprises a processor and said ETU is further configured such that closing said first switch to provide the power output from said energy-storage device to the tripping mechanism further includes:
   determining by said processor that the second voltage is equal to or greater than the threshold voltage; and
   sending a signal from said processor to close said first switch.

6. The ETU of claim 1, wherein said microcontroller comprises a processor coupled to said peripheral port and a memory coupled to said processor, said ETU is further configured to communicate with the external device using said processor when the external device is coupled to said peripheral port.

7. The ETU of claim 6, wherein said memory includes at least one setting pertaining to said ETU, and said ETU is further configured to send the at least one setting to the external device using said peripheral port.

8. The ETU of claim 6, wherein said memory includes at least one setting pertaining to said ETU, and said ETU is further configured to:
   receive data from the external device using said peripheral port; and
   change the at least one setting pertaining to said ETU.

9. The ETU of claim 6, wherein to divert the power input away from the at least one component, said microcontroller is configured to issue a pulse to a low-dropout linear regulator that causes the low-dropout linear regulator to decrease power to any components receiving power from the low-dropout linear regulator.

10. A system comprising:
   a circuit breaker comprising a tripping mechanism;
   an external device; and
   an electronic trip unit (ETU) comprising:
   a peripheral port;
   a power converter;

a microcontroller; and an energy-storage device, wherein said peripheral port is coupled to said external device, said power converter is coupled to said peripheral port and said energy-storage device, said energy-storage device is coupled to said tripping mechanism, wherein said tripping mechanism is configured to trip upon receipt of a voltage greater than or equal to a threshold voltage, and said ETU is configured to:

receive a power input having a first voltage from said peripheral port, wherein the first voltage is less than the threshold voltage;

determine, using said microcontroller, that providing a portion of the power input from said peripheral port to at least one component of said ETU would prevent said ETU from becoming sufficiently charged to generate a voltage greater than or equal to the threshold voltage;

divert, based on the determination, the power input away from the at least one component;

convert at least a portion of the power input to a power output having a second voltage using said power converter and said energy-storage device, wherein the second voltage is greater than the first voltage; and provide the power output from said energy-storage device to said tripping mechanism when the second voltage is greater than or equal to the threshold voltage.

11. The system of claim 10, wherein said ETU further comprises a first switch coupled between said peripheral port and said power converter, and said ETU is further configured to close said first switch to transmit the at least a portion of the power input to said power converter.

12. The system of claim 11, wherein said ETU further microcontroller comprises a processor and said ETU is further configured such that closing said first switch to transmit the at least a portion of the power input to said power converter further includes sending a signal from said processor to close said first switch.

13. A method for enabling an electronic trip unit (ETU) to trip a circuit breaker using power from an external device, the ETU including a peripheral port, a power converter, a microcontroller, and an energy-storage device, wherein the peripheral port is configured to be coupled to the external device, the power converter is coupled to the peripheral port and the energy-storage device, the energy-storage device is coupled to a tripping mechanism within the circuit breaker, wherein the tripping mechanism is configured to trip upon receipt of a voltage greater than or equal to a threshold voltage, said method is implemented by the ETU and comprises:

receiving a power input having a first voltage from the peripheral port, wherein the first voltage is less than the threshold voltage;

determining, using the microcontroller, that providing a portion of the power input from the peripheral port to at least one component of the ETU would prevent the ETU from becoming sufficiently charged to generate a voltage greater than or equal to the threshold voltage;

diverting, based on the determination, the power input away from the at least one component;

converting at least a portion of the power input to a power output having a second voltage using the power converter and the energy-storage device, wherein the second voltage is greater than the first voltage; and determining when the second voltage is greater than or equal to the threshold voltage.

14. The method of claim 13, further comprising providing the power output from the energy-storage device to the tripping mechanism upon determining that the second voltage is greater than or equal to the threshold voltage.

15. The method of claim 13, wherein the ETU further includes a first switch coupled between the peripheral port and the power converter, said method further comprises closing the first switch to transmit the at least a portion of the power input to the power converter.

16. The method of claim 15, wherein the microcontroller includes a processor and said closing the first switch to transmit the at least a portion of the power input to the power converter comprises sending a signal from the processor to close the first switch.

17. The method of claim 13, wherein the ETU further includes a first switch to control a supply of power from the energy-storage device to the tripping mechanism, said method further comprises closing the first switch to provide the power output from the energy-storage device to the tripping mechanism.

18. The method of claim 17, wherein the microcontroller further includes a processor and said closing the first switch to provide the power output from the energy-storage device to the tripping mechanism comprises:

determining by the processor that the second voltage is equal to or greater than the threshold voltage; and sending a signal from the processor to close the first switch.

19. The method of claim 13, wherein the ETU further includes at least one current-limiting device operatively coupled to the peripheral port, said receiving a power input having a first voltage from the peripheral port further comprises receiving a power input including a steady-state current and an in-rush current, and said method further comprises transmitting the power output to the current-limiting device to limit at least one of the steady-state current and the in-rush current.

20. The method of claim 13, wherein diverting the power input comprises issuing a pulse from the microcontroller to a low-dropout linear regulator that causes the low-dropout linear regulator to decrease power to any components receiving power from the low-dropout linear regulator.

* * * * *